United States Patent [19]
McJunkin, Jr.

[11] Patent Number: 5,397,275
[45] Date of Patent: Mar. 14, 1995

[54] BICYCLE SPROCKET CHAIN DAMPER

[76] Inventor: Howard P. McJunkin, Jr., 862 Alta Rd., Charleston, W. Va. 25314

[21] Appl. No.: 120,414

[22] Filed: Sep. 14, 1993

[51] Int. Cl.6 ............................................. B62J 13/02
[52] U.S. Cl. ................................. 474/147; 280/304.3
[58] Field of Search ............... 474/101, 140, 144, 146, 474/147, 116; 280/261, 304.3

[56] References Cited

U.S. PATENT DOCUMENTS

| | | | |
|---|---|---|---|
| 599,884 | 3/1898 | Wills | 474/147 |
| 611,750 | 10/1898 | Fulford | 474/147 |
| 650,238 | 5/1900 | Gubbins et al. | 474/116 |
| 1,001,971 | 8/1911 | McKellar | 474/116 |
| 1,435,611 | 11/1922 | Lewis | 474/116 |
| 3,939,730 | 2/1976 | Dehaan | 474/147 |
| 4,054,063 | 10/1977 | Perrin | 474/147 |
| 4,158,402 | 6/1979 | Romans | 474/147 X |
| 4,194,413 | 3/1980 | Hentze | 474/147 X |
| 4,786,071 | 11/1988 | Nagano | 280/289 |
| 4,960,402 | 10/1990 | Klein | 474/80 |

FOREIGN PATENT DOCUMENTS 655 of 1895 United Kingdom ................ 474/147

*Primary Examiner*—Roger J. Schoeppel
*Attorney, Agent, or Firm*—Cushman Darby & Cushman

[57] ABSTRACT

For damping undesirable whipping of a bicycle sprocket chain, especially of a mountain bike when it is being ridden rapidly downhill over rough terrain, and thereby preventing chain suck, a segment of the return run of the chain extending tangentially forwards from the pitch circle of the idler sprocket towards the pitch circle of the drive sprocket in use, is encased within a tube. The tube is mounted by a bracket to the axle of the idler sprocket, and is loose and slippery enough to permit desirable running of the drive chain, while restraining and preventing undesirable deviations, especially in a vertical plane (i.e., transversally or laterally of the running path of the drive chain). Conveniently, the tube may be a self-recoiling longitudinally split member for ease of installation on the chain, and its bracket can be springly clipped over the conventional mounting structure of the idler sprocket.

10 Claims, 2 Drawing Sheets

5,397,275

BICYCLE SPROCKET CHAIN DAMPER

BACKGROUND OF THE INVENTION

When racing a bicycle, particularly when racing a mountain bike downhill, there are intervals during which the drive chain, particularly along its lower (return) run is under little tension, and subjected to varying high forces and vibration. During these intervals, the chain can whip wildly. All too frequently, if the drive sprocket is cranked while the chain is whipping, the loose chain will become jammed (wedged) between the sprocket and the bicycle frame. This event is sometimes designated to mountain biking enthusiasts by the term "chain suck".

Others have proposed solutions to this problem.

The U.S. Pat. of Nagano, 4,786,071, issued Nov. 22, 1988, discloses a device (perhaps the one sold as the Shimano Sharktooth), which mounts on the chain stay of the frame and has a guard body flange which extends upwards and inwards on a slant to intercept and thereby guide the lower run of the chain from below.

The U.S. Pat. of Klein 4,960,402, issued Oct. 2, 1990, discloses a device, similar to Nagano's and said to be an improvement. It has additional curved flanges 40, 41, 42 which are said to raise the chain out of the chain ring teeth.

It is the present inventor's conclusion from reviewing those two prior art patent documents, that the devices shown in them will not damp undesirable bicycle sprocket drive chain vibration. Rather, these devices attempt to prevent the chain from becoming stuck only after the chain already has been displaced, e.g., by the high forces encountered when cycling downhill off-road at high speed, such as at forty miles per hour.

On a conventional mountain bike, undamped chain motions can be caused by transient waves or inertial displacement, or both, in the vertical plane. Lateral forces usually are relatively low assuming the bike is upright.

SUMMARY OF THE INVENTION

For damping undesirable whipping of a bicycle sprocket chain, especially of a mountain bike when it is being ridden rapidly downhill over rough terrain, and thereby preventing chain suck, a segment of the return run of the chain extending tangentially forwards from the pitch circle of the idler sprocket towards the pitch circle of the drive sprocket in use, is encased within a tube. The tube is mounted by a bracket to the axle of the idler sprocket, and is loose and slippery enough to permit desirable running of the drive chain, while restraining and preventing undesirable displacements, especially in a vertical plane (i.e., transversally or laterally of the running path of the drive chain). Conveniently, the tube may be a self-recoiling longitudinally split member for ease of installation on the chain, and its bracket can be springly clipped over the conventional mounting structure of the idler sprocket, freely pivoting on the idler axle.

The principles of the invention will be further discussed with reference to the drawings wherein the preferred embodiment is shown. The specifics illustrated in the drawings are intended to exemplify, rather than limit, aspects of the invention as defined in the claims.

DETAILED DESCRIPTION

Figure 3:
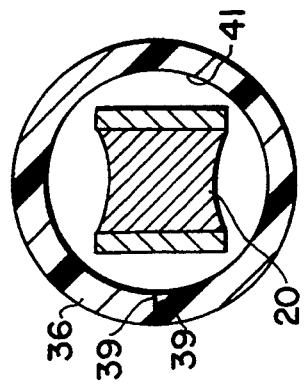
FIG. 3 is a transverse cross-sectional view of the tube of the damper and of the drive chain, on line 3—3 of FIG. 1.
Figure 1:
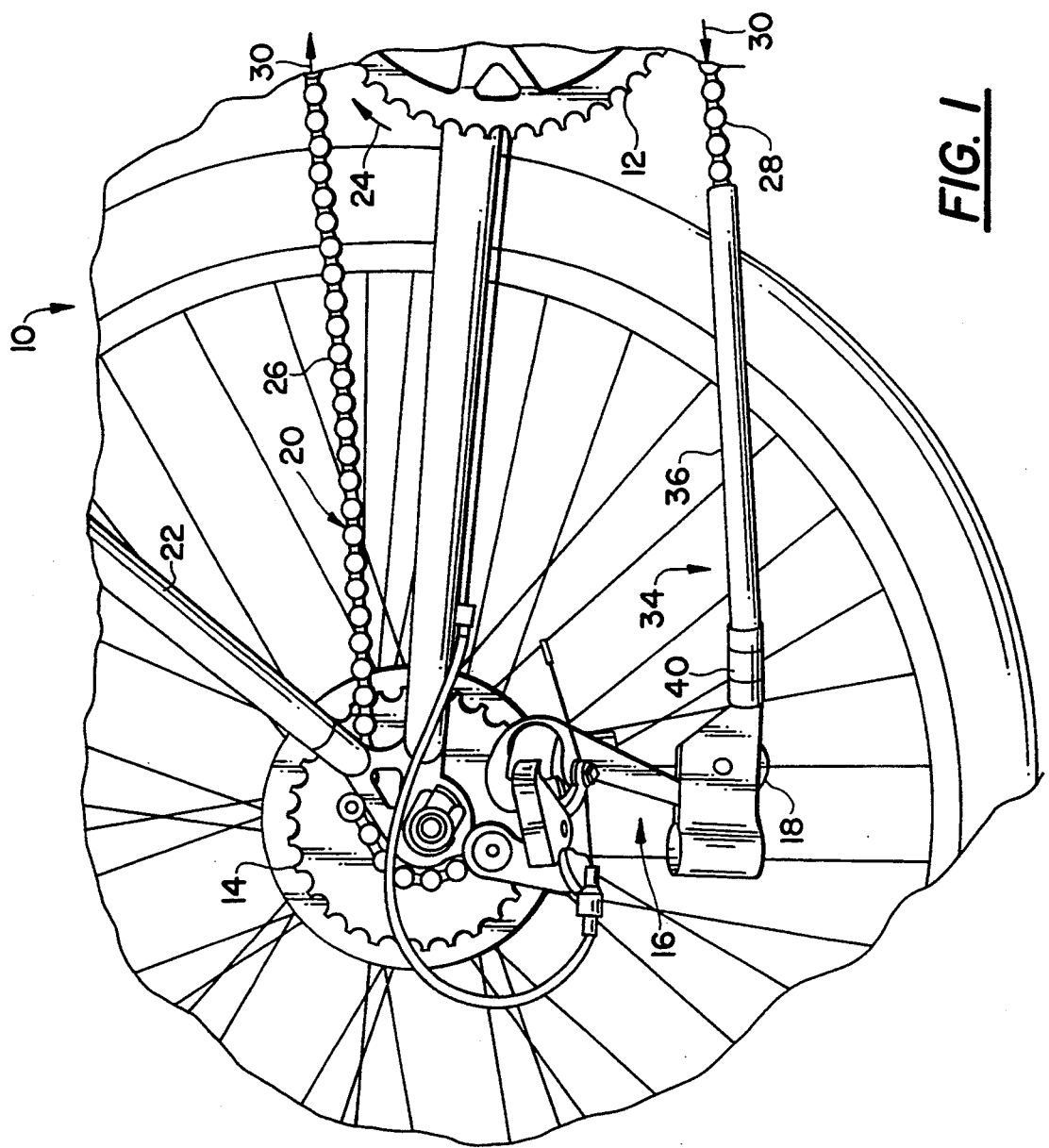
FIG. 1 is a right side elevational view of a bicycle sprocket chain damper embodying principles of the present invention, the drive sprocket, drive chain and its path, idler sprocket, rear sprocket derailleur and adjacent bicycle frame portions being shown schematically in relation thereto.
Figure 2:
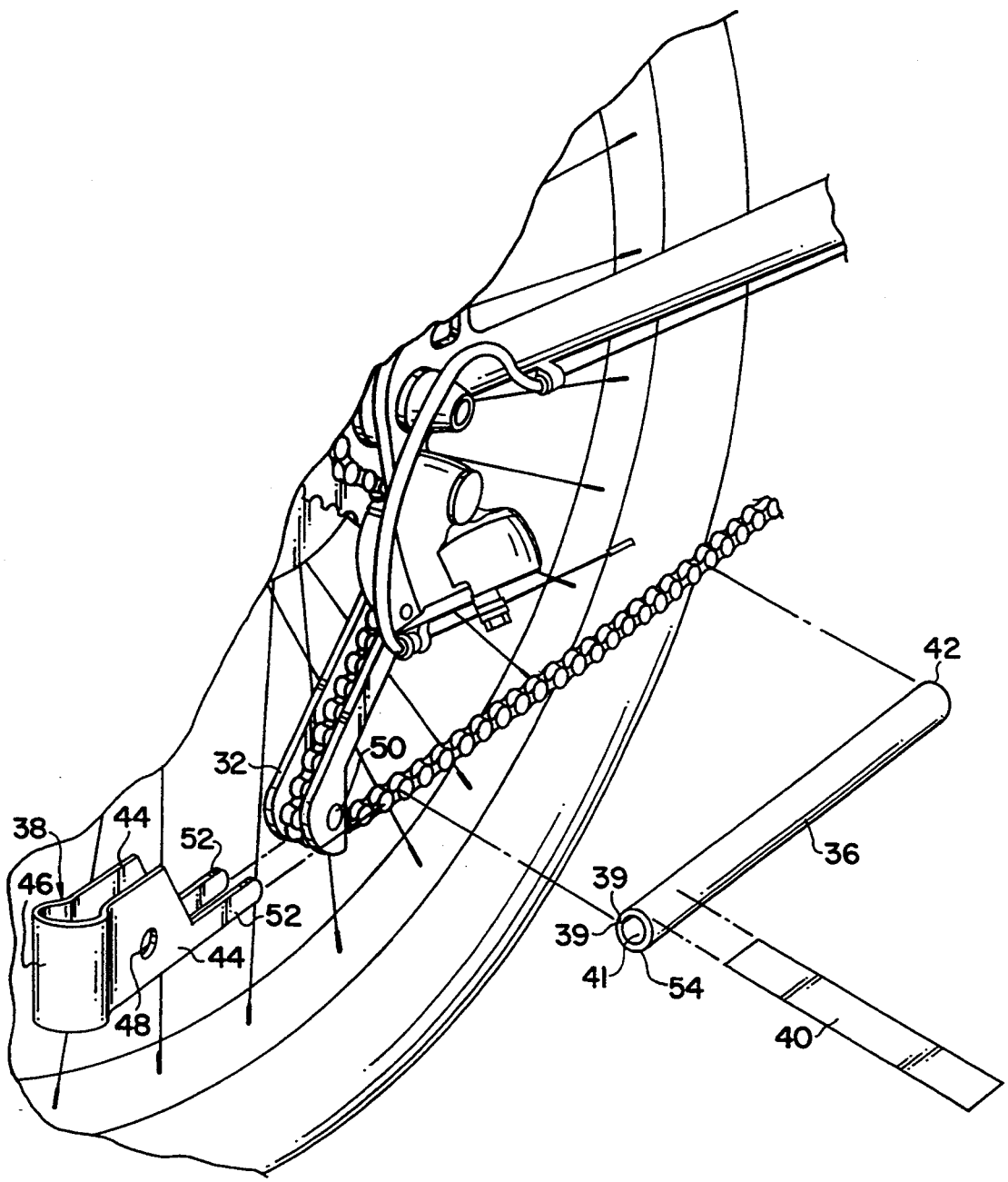
FIG. 2 is an exploded perspective view of the bicycle sprocket chain damper from the right, top and rear.

An otherwise conventional bicycle, especially, but not necessarily, a mountain bike, is suggested in FIG. 1 at 10. In this view, there are shown the bicycle's drive sprocket 12, rear sprocket 14, derailleur 16, idler sprocket 18, the drive chain 20 entrained about the sprockets 12, 14, 18 and the adjacent portions of the bicycle frame 22. As is conventional, cranking the drive sprocket 12 in the rotary direction indicated by the arrow 24 pulls the upper, driving run 26 of the drive chain forwards and pushes the lower, return run 28 rearwards, along a drive chain running path 30.

Ideally, the conventional mounting structure 32 of the idler sprocket causes the idler sprocket to maintain such tension on the drive chain that the return run 28 extends along a tangent of the pitch circle of the respective gear in use on the drive sprocket and along a tangent of the pitch circle of the idler sprocket.

Were it not for provision of the bicycle sprocket chain damper 34 of the present invention, there are some expectable conditions of use of the bicycle 10 in which the return run 28 whips up and down with a substantial amplitude in a vertical plane, and to a lesser extent from side to side, as gravitational forces acting on the idler sprocket and chain cause alternating slackening and tensioning of the chain in that portion of its path. Most notable among the conditions of use in which the chain will vibrate so undesirably are when the bike is a mountain bike being ridden off-road, downhill, at a high rate of speed, e.g., forty miles per hour.

At such times, the chain may whip around so much that, particularly if the person starts to pedal while such vibration is taking place, chain suck will occur: the chain will become jammed.

The device 34 of the present invention aims at solving the problem by damping oscillation of the chain during the time that the above-described operating conditions are being experienced.

In the presently preferred embodiment, the bicycle sprocket chain damper includes three components, namely a slippery tube 36, a mounting bracket 38 and a fastener 40.

The slippery tube 36 preferably is constituted by a longitudinally split tubular element, open at both ends and arranged to extend throughout from 25 percent to 75 percent of the length of the return run of the sprocket chain, and most preferably, throughout about half of the length of the return run. The tube 36 may be formed by longitudinally slitting an initially circumferentially continuous tube of round to obround transverse cross-section, or by molding, extruding or roll-forming a parison or sheet into convolute-wound shape (e.g., so as to extend throughout 345 degrees to 450 degrees in its perimetrical direction relative to the longitudinal axis of the tube). The internal dimensions of the tube are sufficient to permit easy passage of the chain, for instance, from 1.2 to 3.0 times the maximum transverse dimension of links of the chain.

Accordingly, the tube can be installed around the return run of the chain without longitudinally interrupting the chain, by simply resiliently uncoiling the tube towards flatness so as to open up a longitudinal slot between the edges 39, laterally engulfing a segment of the return run into the longitudinal bore 41 of the tube through that slot, and allowing the tube to again coil itself so as to close, or nearly close the slot (so the chain cannot, in use, whip sideways through the slot and out of the bore 41). The tube 36 preferably is made of a resilient, lubricous plastic material such as polyethylene terephthalate, nylon or polyethylene. Less desirably, it would be made of aluminum or steel. Although its forward end 42 is shown being blunt cut, actually it could be belled, so as to minimize or eliminate chances of chain elements from catching on or severely abrading the tube at the entrance end of the bore.

The mounting bracket 38 preferably is provided in the form of a stiff but somewhat resilient or bendable U-shaped clip, e.g., made of aluminum or steel plate. It could be made of durable plastic material. Its two transversely spaced, generally parallel, longitudinally extending face plate flanges 44 are joined at the rear by an integral base flange 46. Openings 48 are formed through the face plate flanges in axial alignment transversally of the device 34 on a horizontal axis. By preference, these openings 48 are slightly larger than the bolt heads and/or nuts of the nut-and-bolt assembly or equivalent fastener assembly 50 which provides the axle for the idler sprocket 18.

The bracket 38 is installed by temporarily spreading the flanges 44 apart, sufficiently to permit the bracket to be slipped around the corresponding part of the mounted idler sprocket 14, and slid along until one nut or bolt head of the assembly 50 pops out through one of the holes 48, and the other pops out through the other of the holes 48.

The flanges 44 include confronting complementary semicylindrically tubular prongs 52.

The bracket 38 is anchored in place and connected to the trailing end portion 54 of the tube 36 after the bracket and tube have been separately installed as described above, by sandwiching the rear-end portion of the tube between the semicylindrical prongs 52, squeezing the face flanges and, thus, the prongs towards one another so that the prongs grip abut the rearmost 0.5 to 1.5 inches of the tube between them, whereupon the fastener 40 is installed to maintain that squeezing, gripping relationship. The fastener 40 may simply be a convolute-wound piece of electrician's waterproof black pressure-sensitive adhesive-backed plastic tape. As an alternative, a conventional hose clamp could be used.

In use, the composite longitudinal bore through the tube and bracket permits the chain to run freely along the desirable return segment of the chain running path, but contact with the bore wall of that bore, temporarily early in each attempted oscillatory excursion of the chain (before it has gained great momentum transverse to the chain running path), damps chain vibration and thereby prevents chain suck.

In variations from the illustrated embodiment, the tube 36 could be formed as an extrusion that is generally C-shaped in transverse cross-section, whether polygonal or round. For instance, it could be four-sided, with a longitudinal slot interrupting the continuity of one side. Perforations can be formed in the tube extending through its thickness for allowing water to drain from the drive chain and tube. A friction damper could be provided between the mounting bracket and derailler.

Although the device of the invention has been described as if it were an aftermarket, user-installed accessory, a device of the same or equivalent construction can be dealer installed, factory installed or built into the design of the bike.

It should now be apparent that the bicycle sprocket chain damper as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A bicycle sprocket chain damper for the return run of a sprocket chain entrained about a drive sprocket and a rear sprocket and resiliently tensioned by entrainment about an idler sprocket mounted on a bicycle frame-supported transverse, horizontal axle having at least one protruding end, the return run extending along a chain running path which includes a segment extending from tangency with a gear pitch circle of the drive sprocket to tangency with a gear pitch circle of the idler sprocket, for restraining and thereby damping oscillatory excursions of the drive chain transversally of said path within said segment of said path, the drive chain having a given maximum dimension transversally of said path, said sprocket chain damper comprising:
   a tube having a longitudinal throughbore extending between a free leading end thereof and a trailing end thereof, said longitudinal bore being between 25 percent and 75 percent as long as said segment and having internal dimensions just sufficient to permit easy passage of the chain; and
   mounting means for mounting only said trailing end of said tube to the bicycle frame, with sufficient rigidity that when said chain, moving transversally of said path, impacts said tube from within, said tube restrains transverse oscillatory amplitude of said chain and said free leading end of said tube remains cantilevered from said mounting of said trailing end.

2. The bicycle sprocket chain damper of claim 1, wherein:
   said tube is a longitudinally split tube having two circumferentially opposite longitudinal edges, there being insufficient spacing between said edges to permit said chain to enter transversally into or exit transversally from said split tube longitudinal throughbore unless said split tube is temporarily flexed so as to temporarily open up a sufficient gap between said edges.

3. The bicycle sprocket chain damper of claim 2, wherein:
   said tube is made of synthetic plastic material.

4. The bicycle sprocket chain damper of claim 1, wherein:
   said mounting means includes a U-shaped bracket which has two opposed face plates having openings which are horizontally coaxially aligned transversally of said tube and arranged to receive respective ones of said protruding ends of said axle, with said idler sprocket sandwiched between said face plates.

5. The bicycle sprocket chain damper of claim 4, wherein:

said tube is a longitudinally split tube having two circumferentially opposite longitudinal edges, there being insufficient spacing between said edges to permit said chain to enter transversally into or exit transversally from said longitudinal throughbore unless said split tube is temporarily flexed so as to temporarily open up a sufficient gap between said edges.

6. The bicycle sprocket chain damper of claim 5, wherein:

said tube is made of synthetic plastic material.

7. A bicycle sprocket chain damper for the return run of a sprocket chain entrained about a drive sprocket and a rear sprocket and resiliently tensioned by entrainment about an idler sprocket mounted on a bicycle frame-supported transverse, horizontal axle having at least one protruding end, the return run extending along a chain running path which includes a segment extending from tangency with a gear pitch circle of the drive sprocket to tangency with a gear pitch circle of the idler sprocket, for restraining and thereby damping oscillatory excursions of the drive chain transversally of said path within said segment of said path, the drive chain having a given maximum dimension transversally of said path, said sprocket chain damper comprising:

a tube having a longitudinal throughbore extending between a leading end thereof and a trailing end thereof, said longitudinal bore being between 25 percent and 75 percent as long as said segment and having internal dimensions just sufficient to permit easy passage of the chain;

said tube being a longitudinally split tube having two circumferentially opposite longitudinal edges, there being insufficient spacing between said edges to permit said chain to enter transversally into or exit transversally from said longitudinal throughbore unless said split tube is temporarily flexed so as to temporarily open up a sufficient gap between said edges;

said tube being made of synthetic plastic material;

mounting means for mounting said trailing end of said tube to the bicycle frame with sufficient rigidity that when said chain, moving transversally of said path, impacts said tube from within, said tube restrains transverse oscillatory amplitude of said chain;

said mounting means including a U-shaped bracket which has two opposed face plates having openings which are horizontally coaxially aligned transversally of said tube and arranged to receive respective ones of said protruding ends of said axle, with said idler sprocket sandwiched between said face plates;

said face plates including corresponding generally semicylindrical leading portions which are concave towards one another;

said leading portions sandwiching a trailing end portion of said tube between them; and said mounting means further including clamping means clamping said leading portions of said face plates radially inwardly against said trailing end portion of said tube.

8. The bicycle sprocket chain damper of claim 7, wherein:

said clamping means is provided by a wrapping of pressure-sensitive adhesive tape.

9. The bicycle sprocket chain damper of claim 8, wherein:

said U-shaped bracket is made of aluminum or steel.

10. A bicycle sprocket chain damper, comprising:

a tube having a forward end, a rear end and a throughbore, through which a run of a bicycle sprocket chain can longitudinally travel, while being restrained by contact with a longitudinal bore wall of said tube against transverse travel beyond a predetermined limited amount; and means for mounting only said rear end of the tube to a frame of a bicycle and to extend forwardly in cantilever to said forward end, so as to substantially coaxially align said throughbore along only a rear portion of a sprocket chain return run travel path which extends between tangency with a gear pitch circle of drive sprocket of the bicycle and tangency with a gear pitch circle of an idler sprocket of the bicycle.

* * * * *